United States Patent [19]
Date

[11] Patent Number: 5,857,078
[45] Date of Patent: Jan. 5, 1999

[54] NETWORK FOR TRANSFERRING CONSECUTIVE PACKETS BETWEEN PROCESSOR AND MEMORY WITH A REDUCED BLOCKING TIME

[75] Inventor: Yuuki Date, Yamanashi, Japan

[73] Assignee: NEC Corporation, Tokyo, Japan

[21] Appl. No.: 975,682

[22] Filed: Nov. 21, 1997

Related U.S. Application Data

[63] Continuation of Ser. No. 495,261, Jun. 27, 1995, abandoned.

[30] Foreign Application Priority Data

Jun. 27, 1994 [JP] Japan .................................. 6-145100

[51] Int. Cl.⁶ ............................. G06F 13/38; G06F 15/17
[52] U.S. Cl. ............................... 395/200.64; 395/800.24; 395/876; 711/104
[58] Field of Search ...................... 370/230; 395/200.55, 395/200.64, 800.24, 800.27, 800.38, 872, 876, 200.83, 200.43; 711/104, 105, 127, 150

[56] References Cited

U.S. PATENT DOCUMENTS

| | | | |
|---|---|---|---|
| 4,320,502 | 3/1982 | DeVeer | 370/85 |
| 4,480,307 | 10/1984 | Budde et al. | 364/200 |
| 4,560,985 | 12/1985 | Strecker et al. | 340/825.5 |
| 4,724,520 | 2/1988 | Athanas et al. | 364/200 |
| 4,862,454 | 8/1989 | Dias et al. . | |
| 4,942,569 | 7/1990 | Maeno | 370/60 |
| 5,053,942 | 10/1991 | Srini | 364/200 |
| 5,251,209 | 10/1993 | Jurkevich et al. | 370/82 |
| 5,313,458 | 5/1994 | Suzuki | 370/56 |
| 5,339,313 | 8/1994 | Ben-Michael et al. | 370/85.13 |
| 5,392,436 | 2/1995 | Jansen et al. | 395/725 |
| 5,418,912 | 5/1995 | Christenson | 395/200 |
| 5,467,295 | 11/1995 | Young et al. | 395/200.05 |
| 5,467,347 | 11/1995 | Peterson | 370/60.1 |

OTHER PUBLICATIONS

Takao Takeuchi et al., "Switch Architectures and Technologies for Asynchronous Transfer Mode", IEICE Transactions, vol. E74, No. 4 (Apr. 1991), pp. 752–760.

"Chaos Router: Architecture and Performance," S. Konstantinidou, *Computer Architecture News*, vol. 19, No. 3, May, 1995, pp. 212–221.

*Primary Examiner*—Mark H. Rinehart
*Attorney, Agent, or Firm*—Sughrue, Mion, Zinn, Macpeak & Seas, PLLC

[57] ABSTRACT

For making in a parallel computer system an interconnection network transfer data sequences, each composed of consecutive packets, from input ports (17) to a destination port indicated among output ports (19) by a routing address specified by a leading packet of each data sequence, control registers (31) hold the routing address of a privileged sequence determined by arbiters (39) in response to such addresses held in the control registers and stored in control buffers (33). Data of the consecutive packets of the privileged sequence are simultaneously stored in and produced from data buffers (37). Controlled by the arbiters, input selectors (41, 43) select the data for delivery to the destination port through output buffers (55) and output selectors (57) controlled by a selector operating arrangement (59–63). When the data of the consecutive packets are not yet wholly stored in the data buffers, the input selectors select only those already stored in the data suffers and then select the data of remaining ones of the consecutive packets as soon as they reach the data buffers.

10 Claims, 5 Drawing Sheets

| INPUTS OF 47(1) | | | | | | OUTPUTS OF 47(1) | | | | |
|---|---|---|---|---|---|---|---|---|---|---|
| 451-0 | 451-1 | 451-2 | 451-3 | 491-0 | 511-0 | 391-0 | 391-1 | 391-2 | 391-3 | 391-4 |
| 0 | 0 | 0 | 0 | X | X | 00 | 00 | 0 | 0 | 0 |
| 1 | X | X | X | 0 | 0 | 10 | 10 | 0 | 0 | 0 |
| 0 | 1 | X | X | 0 | 0 | 11 | 11 | 0 | 0 | 0 |
| 0 | 0 | 1 | X | 0 | 0 | 10 | 00 | 0 | 1 | 0 |
| 0 | 0 | 0 | 1 | 0 | 0 | 11 | 01 | 0 | 0 | 1 |
| X | X | 1 | X | 1 | 0 | 00 | 00 | 1 | 0 | 0 |
| X | X | X | 1 | 0 | 1 | 00 | 01 | 1 | 0 | 0 |
| OTHER PATTERNS | | | | | | 00 | 00 | 0 | 0 | 0 |

| INPUTS OF 45(1) | | | | OUTPUTS OF 45(1) | | | |
|---|---|---|---|---|---|---|---|
| 331-0 | 332-0 | 311-0 | 312-0 | 451-0 | 451-1 | 451-2 | 451-3 |
| 00 | 00 | 00 | 00 | 0 | 0 | 0 | 0 |
| 01 | 01 | 01 | 01 | 0 | 0 | 0 | 0 |
| 10 | 10 | 10 | 10 | 1 | 1 | 1 | 1 |
| 11 | 11 | 11 | 11 | 0 | 0 | 0 | 0 |

FIG. 5

| CONTROL FOR 41(1) | SELECTED DATA | |
|---|---|---|
| 391-1 | 411-0 | 411-1 |
| 00 | 351-0 | 0 |
| 01 | 352-0 | 0 |
| 10 | 371-0 | 371-0 |
| 11 | 372-0 | 372-0 |

FIG. 7

| CONTROL FOR 43(1) | SELECTED DATA |
|---|---|
| 391-2 | |
| 0 | 411-0 |
| 1 | 411-1 |

FIG. 8

| INPUTS OF 45(2) | | | | OUTPUTS OF 45(2) | | | |
|---|---|---|---|---|---|---|---|
| 331-0 | 332-0 | 311-0 | 312-0 | 452-0 | 452-1 | 452-2 | 452-3 |
| 00 | 00 | 00 | 00 | 0 | 0 | 0 | 0 |
| 01 | 01 | 01 | 01 | 0 | 0 | 0 | 0 |
| 10 | 10 | 10 | 10 | 0 | 0 | 0 | 0 |
| 11 | 11 | 11 | 11 | 1 | 1 | 1 | 1 |

NETWORK FOR TRANSFERRING CONSECUTIVE PACKETS BETWEEN PROCESSOR AND MEMORY WITH A REDUCED BLOCKING TIME

This is a Continuation of application Ser. No. 08/495,261, filed on Jun. 27, 1995, abandoned.

BACKGROUND OF THE INVENTION

This invention relates to an interconnecting network for use in a parallel computer system in transferring between a processor unit and a memory unit consecutive packets representative of data.

A recent trend in electronic digital computers is to use as a parallel computer system a great number of computer units in parallel. The parallel computer system comprises a plurality of processors collectively as a processor unit and a plurality of memories as a memory unit. Data sequences are bidirectionally transferred between the processor unit and the memory unit through interconnection networks.

In the manner described in an invited paper contributed by Takao Takeuchi and two others to the IEICE Transactions, Volume E 74, No. 4 (April 1991), pages 752 to 760, under the title of "Switch Architectures and Technologies for Asynchronous Transfer Mode", each data sequence is transmitted through an interconnection network as consecutive packets. Various interconnection networks are already known. Each interconnection network has a first plurality of input ports and a second plurality of output ports. The first plurality may be equal to the second plurality.

As will later be described in more detail, the data sequences are supplied to the input ports. Each data sequence comprises a leading packet among the consecutive packets to specify one of the output ports that should be supplied with the data sequence under consideration.

Control buffers are connected to the input ports, respectively, to store the leading packets of the data sequences. Data buffers are connected to the input ports, respectively. Each data buffer stores the leading packet and others of the consecutive packets of the data sequence supplied to one of the input ports that is connected to the data buffer in question. The leading packet and the others of consecutive packets are stored collectively as stored packets. A selector unit is connected to the data buffers and to the output ports to select one of the data buffers that should deliver the stored packets to a certain one of the output ports.

Each of arbiters, equal in number to the control buffers, is connected to the control buffers and to the selector unit. With reference to the leading packets stored in the control buffers to specify one of the output ports in common as a destination port, the arbiters determine one of the data buffers at a time that should deliver the stored packets as output packets to the destination port. In this manner, the arbiters give a priority right for each of the output ports to one of the data sequences to make this one of the data sequences serve as a privileged sequence. The interconnection network serves as a crosspoint device operable in machine cycles.

If the privileged sequence and a different sequence of the data sequences are supplied to two of the input ports earlier and later in one machine cycle to have a destination port in common, the selector unit selects the stored packets of the privileged sequence. Having produced these stored packets as the output packets, the selector unit selects the stored packets of the different sequence. If the privileged sequence consists of N consecutive packets, where N represents a natural number, the consecutive packets of the different sequence must be kept in the data buffer therefor during N machine cycles. In this manner, this conventional interconnection network is operable with an unduly long blocking time of overloading the interconnection network. The conventional interconnection network has a low throughput or internal link speed to adversely affect performances of the processor unit and of the parallel computer system.

SUMMARY OF THE INVENTION

It is consequently an object of the present invention to provide an interconnection network for use in a parallel computer system in transferring data sequences, each data sequence composed of consecutive packets, between a processor unit and a memory unit with a high throughput.

It is another object of this invention to provide an interconnection network which is of the type described and which can transfer a fresh sequence of the data sequences with a short blocking time when the fresh sequence should be transferred while a current sequence of the data sequences is transmitted.

It is still another object of this invention to provide an interconnection network which is of the type described and which does not adversely affect performance of a precessor unit of the parallel computer system.

It is yet another object of this invention to provide an interconnection network which is of the type described and which does not adversely affect performance of the parallel computer system.

Other objects of this invention will become clear as the description proceeds.

In accordance with this invention, there is provided an interconnection network which is for use between a processor unit and a memory unit of a parallel computer system in transferring data sequences from a first plurality of input ports to a second plurality of output ports with each data sequence of the data sequences composed of consecutive packets and routed to one of the output ports that is specified by a leading packet of the consecutive packets and which comprises: (A) input buffer means connected to the input ports for storing at least a leading portion of the data sequence with the consecutive packets of the leading portion stored as primary stored packets to simultaneously produce the primary stored packets in one machine cycle as supply packets; (B) input selector means connected to the input buffer means for selecting primary selected packets from the supply packets to produce the primary selected packets and for selecting, as soon as a remaining portion of the data sequence reaches the input buffer means, secondary selected packets from the consecutive packets of the remaining portion to produce the secondary selected packets; and (C) output buffer means connected to the input selector means and to the output ports for storing the primary and the secondary selected packets collectively as secondary stored packets to produce the secondary stored packets as output packets for delivery to the above-mentioned one of output ports.

BRIEF DESCRIPTION OF THE DRAWING

FIG. 5 shows a truth table for use in describing operation of an enamble signal generator used in the first arbiter depicted in FIG. 4;

FIG. 7 shows a selection logic table for use in describing operation of a first selector used in the interconnection network illustrated in FIG. 3;

FIG. 8 shows a selection logic table for use in describing operation of a second selector used in the interconnection network depicted in FIG. 3;

DESCRIPTION OF THE PREFERRED EMBODIMENT

Figure 1:
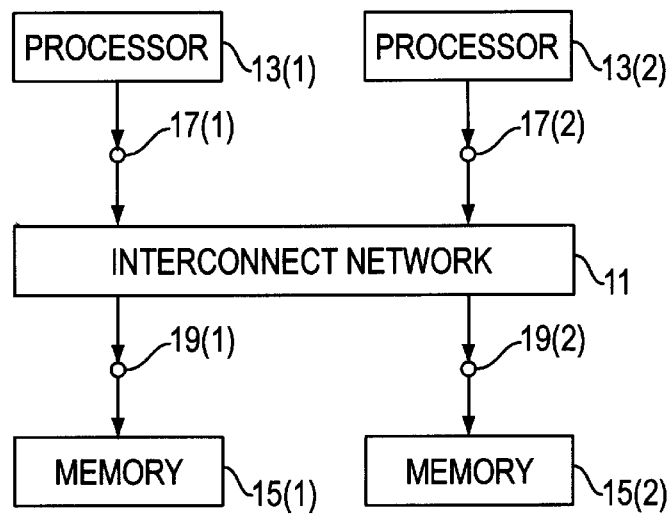
FIG. 1 is a block diagram of a parellell computer system comprising an interconnection network to which the instant invention is applicable.

Referring to FIG. 1, a parallel computer system comprises an interconnection network 11 to which the present invention is applicable. In FIG. 1, the parallel computer system comprises first and second processors 13(1) and 13(2) which are herein referred to collectively as a processor unit 13. First and second common memories 15(1) and 15(2) are collectively referred to as a memory unit 15. Each of the first and the second common memories 15 (suffixes (1) and (2) omitted) is for use in common by the processor unit 13.

First and second input ports 17(1) and 17(2) are interposed between the interconnection network 11 and the first and the second processors 13 (suffixes (1) and (2) omitted). First and second output ports 19(1) and 19(2) are interposed between the interconnection network 11 and the first and the second common memories 15. In general, the interconnection network 11 is for use in transferring data sequences from a first plurality P of input ports 17 to a second plurality of output ports 19. Although the input ports 17 are connected in FIG. 1 to the processor units 13, the input ports 17 may be connected to the memory unit 15 with the output ports 19 connected to the processor unit 13 to transfer reply data as the consecutive packets from the memory unit 15 to the processor unit 13. Each data sequence is composed of from two to four consecutive packets, namely, of up to a predetermined number N of consecutive packets.

The consecutive packets of the data sequences are delivered to the input ports 17 in an asynchronous manner. The interconnection network 11 is, however, operable in machine cycles. It is therefore possible to understand that the input ports 17 are supplied with the consecutive packets of the data sequences in respective machine cycles. The data sequences are routed to desired ones of the output ports 19.

The input ports 17 are identified by first through P-th input port numbers. It is possible to understand without loss of generality that the first through the P-th input port numbers are in an ascending order. The output ports 19 are identified by first through Q-th routing addresses. Each data sequence comprises a leading or foremost packet among the consecutive packets. The leading packet specifies a validity bit and a particular address among the first through the Q-th routing addresses. The validity bit is a binary bit and indicates by a binary one bit that data of the leading packet and others of the consecutive packets are valid. The validity bit of a binary zero bit indicates that such data are invalid. If the output ports 19 are only two in number as illustrated, each routing address is represented also by a binary bit with the first and the second output ports indicated by the binary zero and one bits. The binary one and zero bits will alternatively be referred to as having binary one and zero levels.

Figure 2:
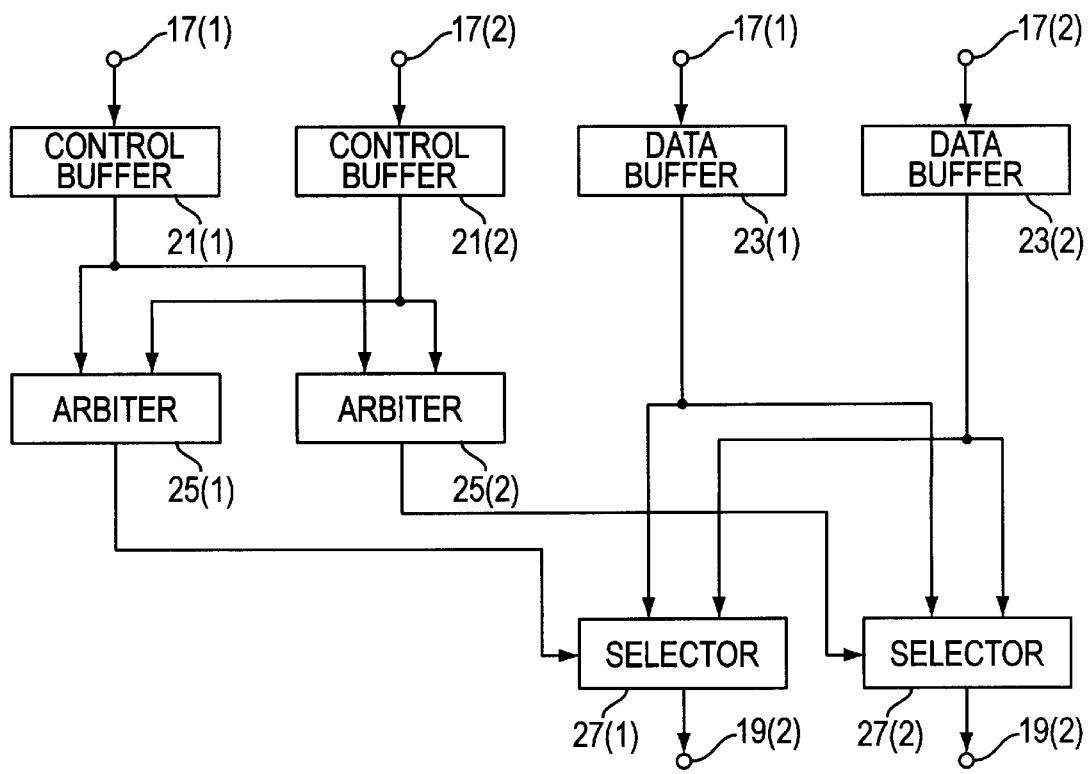
FIG. 2 is a block diagram of a conventional interconnection network.

Turning to FIG. 2, a conventional interconnection network will be described in order to facilitate an understanding of an interconnection network according to this invention. Like in FIG. 1, the conventional interconnection network is for use in transferring between the first and the second input ports 17(1) and 17(2) and the first and the second output ports 19(1) and 19(2) the data sequences of the type described in conjunction with FIG. 1. It should be noted that each of the first and the second input ports 17 is depicted in duplicate merely for convenience of illustration.

The conventional interconnection network comprises first and second control buffers 21(1) and 21(2) connected to the first and the second input ports 17. Supplied to the first and the second input ports 17, first and second sequences of the data sequences comprise the leading packets. Each leading packet represents a datum and specifies the validity bit and one of the routing addresses collectively as a control signal. The first and the second control buffers 21 (suffixes (1) and (2) omitted) are for temporarily storing the control signals of the first and the second sequences as stored signals.

Connected to the first and the second input ports 17, first and second data buffers 23(1) and 23(2) are for storing the data of the leading and the others of consecutive packets of the first and the second sequences as stored data. The data of the first sequence is routed to one of the first and the second output ports 19 that is specified by the routing address indicated by the leading packet of the first sequence. The data of the second sequence are routed to one of the first and the second output ports that is specified by the routing address indicated by the leading packet of the second sequence.

When the leading packets indicative of one of the output ports 19 in common in the first and the second sequences are received by the first and the second input ports 17 substantially concurrently, namely, in one machine cycle, only one of the first and the second sequences must first be dealt with. The other of the first and the second sequences must be processed after processing of the above-mentioned one of the first and the second sequences. One of such data sequences is consequently given a priority right and is used as a privileged sequence. It is possible to give the priority right to the data sequence received by one port of the input ports 17 that is identified by a smallest one of the first through the P-th input port numbers among the input port numbers given to ones of the input ports 17 supplied with the data sequences under consideration, respectively.

Each of first and second arbiters 25(1) and 25(2) is connected to the first and the second control buffers 21. Each of first and second selectors 27(1) and 27(2) is connected to the first and the second data buffers 23 (suffixes (1) and (2) omitted). The first and the second selectors 27 (suffixes (1) and (2) omitted) are connected to the first and the second output ports 19 and therefore correspond to the first and the second output ports 19. The first and the second arbiters 25(1) and 25(2) will either collectively or individually be designated by a simple reference numeral 25.

It will be assumed that the leading packets of the data sequences are received in one machine cycle by some or all of the input ports 17 and that the data sequences should be routed to one of the output ports 19 that is identified by a common address indicated by the leading packets of the data sequences. Under the circumstances, the first and the second arbiters 25 refer to the control signals stored in the first and the second control buffers 21 as regards the common address and as regards the input port numbers of the input ports 17 in question and judge the priority right of each data sequence to determine one of the data sequences as the privileged sequence and to produce a first and a second arbiter signal for delivery to the first and the second selectors 27.

One of the first and the second arbiter signals indicates one of the first and the second data buffers 23 and one of the first and the second output ports 19. This one of the first and the second data buffers 23 is loaded with the leading and the other packets of the privileged sequence. This one of the output ports 19 is the destination port and corresponds to one of the first and the second selectors 27. Controlled by one of the first and the second arbiter signals, this one of the first and the second selectors 27 selects the leading and the other packets of the privileged sequence as output packets for delivery to the destination port in successive machine cycles, It will be presumed that the privileged sequence consists of N consecutive packets. In this event, a different sequence of the data sequences under consideration must be kept in the other of the first and the second data buffers 23 as long as N machine cycles. The conventional interconnection network accordingly has a low throughpet and is operable with a long blocking time.

Figure 3:
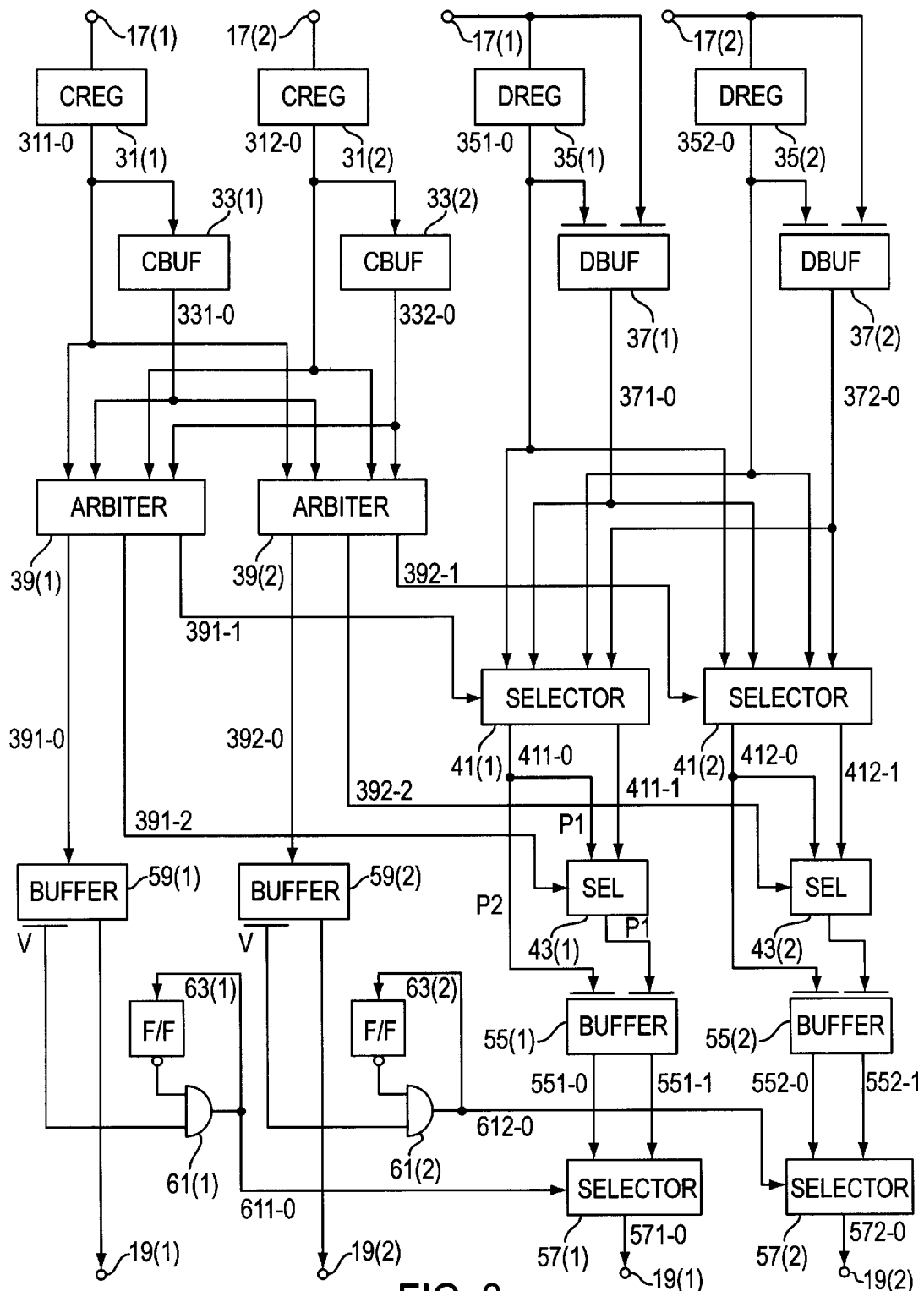
FIG. 3 is a block diagram of an interconnection network according to an embodiment of this invention.

Referring now to FIG. 3, the description will proceed to an interconnection network according to a preferred embodiment of this invention. Similar parts are designated by like reference numerals. It will be assumed merely for simplicity of illustration that the input ports 17 are the first and the second input ports 17(1) and 17(2), that the output ports 19 are the first and the second output ports 19(1) and 19(2), and that each data sequence consists of first and second packets as the consecutive packets. The first packet is the leading packet described in the foregoing. The second packet is a data packet. The leading packets of the data sequences are supplied to the first and the second input ports 17 in respective machine cycles. Like the first and the second input ports 17, the first and the second output ports 19 are depicted in duplicate.

Connected to the first and the second input ports 17, first and second control registers (CREG) 31(1) and 31(2) are for holding, while locked or contents-held as will later be described, the control signals of the leading or the first packets of the data sequences received by the first and the second input ports 17. The first and the second control registers 31(1) and 31(2) will either collectively or individually be designated by a single reference numeral 31. This manner of designation will be used throughout the following.

Among each control signal, the validity bit and the routine address will be denoted by-V and RA. The control signal therefore represents combinations (V, RA). The first and the second output ports 19(1) and 19(2) will be identified by the first and the second routing addresses of the binary zero and one bits. As a result, the control signal represents one of the combinations (0, 0), (1, 0), (1, 1), and so forth at a time for the example being illustrated.

While locked, each of the first and the second control registers 31 holds the control signal as a held signal and produces the held signal. In this manner, the first and the second control registers 31 produce first and second held signals 311-0 and 312-0. Connected to the first and the second control registers 31, first and second control buffers (CBUF) 33(1) and 33(2) or 33 store the first and the second held signals as first and second stored signals and produce the first and the second stored signals as indicated at 331-0 and 332-0.

Connected to the first and the second input ports 17, first and second data registers (DREG) 35(1) and 35(2) or 35 are for holding during one machine cycle the data of the leading packets of the data sequences received by the first and the second input ports 17 at the respective machine cycles. In this manner, the first and the second data buffers 35 hold first and second held data. At a next machine cycle, each of the first and the second data registers 35 holds as another held datum the datum of the second packet of the data sequence supplied to a pertinent one of the first and the second input ports 17.

More generally, first through (N−1)-th primary data registers are serially connected to the first input port 17(1) collectively as a first data register unit 35(1). Similarly, first through (N−1)-th secondary data registers are connected to the second input port 17(2) as a second data register unit 35(2). Each of the first and the second data register units 35 holds the data of the consecutive packets of a relevent one of the data sequences during (N−1) machine cycles in total. At a further subsequent machine cycle, each of the data register units 35 produces a data train of the data of the first through the N-th consecutive packets from points of serial connection of the first through the (N−1)-th data registers and a pertinent one of the input ports 17 in a "packet-serial" manner. In this manner, the first and the second data register units 35 produce primary and secondary held packets 351-0 and 352-0.

In the example being illustrated, first and second data buffers (DBUF) 37(1) and 37(2) or 37 are connected to the first and the second data registers 35 and to the first and the second input ports 17. Each of the first and the second data buffers 37 stores the data of the leading and the other consecutive packets of the data sequence received by the pertinent one of the input ports 17. When taken into consideration, the data of the first through the N-th consecutive packets of each data sequence are simultaneously stored in a concerned one of the first and the second data buffers 37 as its primary stored data which are herein called primary stored packets. The first and the second data buffers 37 produce their primary stored packets simultaneously in one machine cycle in a "packet-parallel" fashion as first and second primary stored packets 371-0 and 372-0.

In the manner which will presently become clear, first and second arbiters 39(1) and 39(2) or 39 correspond to the first and the second output ports 19 and are operable differently from the first and the second arbiters 25 described in conjunction with FIG. 2. Each of the first and the second arbiters 39 is cross connected to the first and the second control registers 31 and to the first and the second control buffers 33. The first arbiter 39(1) produces primary first and second arbiter signals 391-1 and 391-2 and a primary zeroth arbiter signal 391-0. The second arbiter 39(2) produces secondary first and second arbiter signals 392-1 and 392-2 and a secondary zeroth arbiter signal 392-0.

It will again be assumed that the first and the second sequences are supplied to the first and the second input ports 17, respectively, with the leading packets of the first and the second sequences received in one machine cycle to specify the common address as the particular address and that each of the first and the second sequences consists of the first and the second packets. Referring to the common address and to the first and the second input port numbers, the first and the second arbiters 39 give the priority right to the first sequence and determine the first sequence as the privileged sequence.

In such an event, each of the control signals of the first and the second sequences represents the combination (1,0). If no data sequence precedes the first sequence at the first input port 17(1), the first control register 31(1) produces the control signal of the first sequence while locked. The control signal is not stored in the first control buffer 33(1), which keeps its output signal quiescent, namely, at 0. The control signal of the second sequence is not produced from the second control register 31(2) but is stored in the second control buffer 33(2). The data of the first and the second packets are successively produced from the first data register or register unit 351) and are not stored in the first data buffer 37(1). Irrespective of presence and absence of a data sequence preceding the privileged sequence, the first and the second packets are not produced from the second data register or register unit 35(2) but are stored simultaneously in the second data buffer 37(2). Output signals of the second control register 31(2), the second data resister unit 35(2), and the second data buffer 37(2) are all quiescent.

If followed by the privileged or the first sequence and preceded by no data sequence, a preceding sequence of the data sequences is processed by the interconnection network. In the meanwhile, the control signal of the privileged sequence is stored in the first control buffer 33(1) as a stored signal. The data of the first and the second packets of the privileged sequence are simultaneously stored in the first data buffer 37(1) as stored data. After the preceding sequence is dealt with, the first control register 31(1) is locked. The first control buffer 33(1) produces the combination. Immediately subsequently, the first data buffer 37(1) simultaneously produces the stored data. Output signals of the first control register 31(1) and the second register unit 35(2) are both quiescent.

Like the first and the second arbiters 39, first primary and secondary selectors 41(1) and 41(2) or 41 correspond to the first and the second output ports 19. The first primary and secondary selectors 41 are controlled by the primary and the secondary first arbiter signals. Each of the first primary and secondary selectors 41 is cross connected to the first and the second data register units 35 and to the first and the second data buffers 37. Second primary and secondary selectors (SEL) 43(1) and 43(2) or 43 are serially connected to the first primary and secondary selectors 41 and are controlled by the primary and the secondary arbiter signals. In the manner which will shortly be described, the first primary selector 41(1) produces first primary and secondary selected signals 411-0 and 411-1. The first secondary selector 41(2) produces second primary and secondary selected signals 412-0 and 412-1. The second primary and secondary selectors 43 produce primary and secondary second selected signals 431-0 and 432-0.

Figures 4, 6:
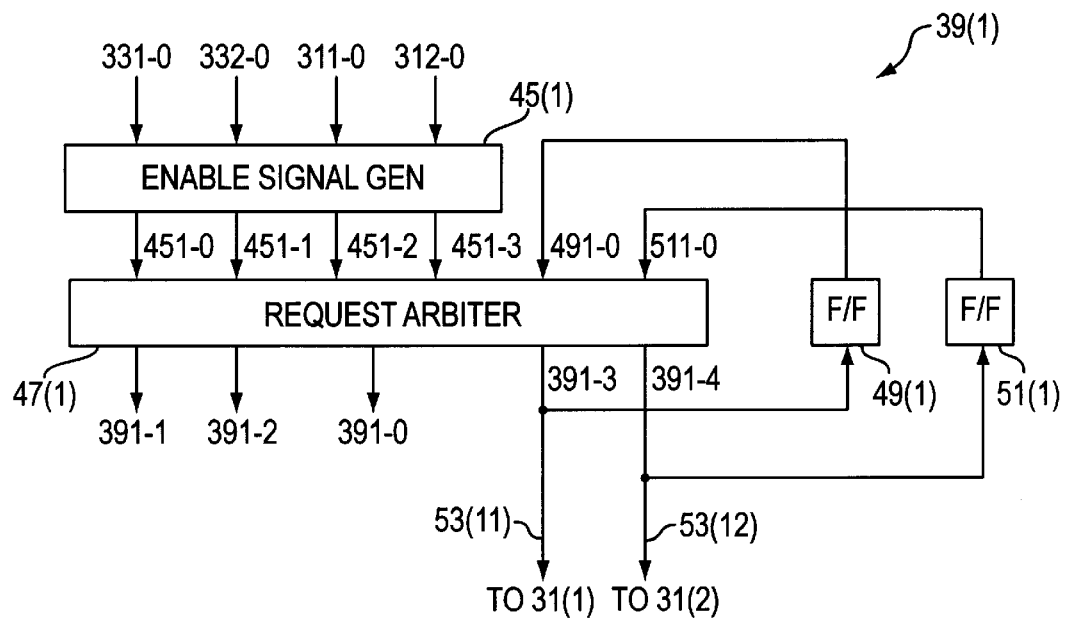
FIG. 4 is a block diagram of a first arbiter for use in the interconnection network illustrated in FIG. 3.
FIG. 6 shows a truth table for use in describing operation of a request arbiter used in the first arbiter illustrated in FIG. 4.

Turning to FIG. 4 during a short while with FIG. 3 continuously referred to, the first arbiter 39(1) comprises a first enable signal generator 45(1) supplied from the first and the second control buffers 33 with stored signals of the first and the second trains 331-0 and 332-0 and from the first and the second control registers 31 with held signals of the first and the second data trains 311-0 and 332-0. As will presently become clear, the first enable signal generator 45(1) produces first through fourth primary enable signals 451-0, 451-1, 451-2, and 451-3 which are given a logic one level only when the validity bit V is the binary one bit and the routing address RA is the binary zero bit indicative of the first output port 19(1) in the control signal supplied from one or the other of the first and the second control buffers 33 and of the first and the second control registers 31.

Connected to the first enable signal generator 45(1) and accompanied by first and second primary loops, a first request arbiter 47(1) is controlled by the first through the fourth primary enable signals and by first and second primary loop input signals 491-0 and 511-0. The first and the second primary loops include first and second primary flip-flops 49(1) and 51(1). The first request arbiter 47(1) produces the primary zeroth through second arbiter signals 391-0 to 391-2 and first and second primary loop output signals 391-3 and 391-4.

In the manner which will presently become clear, the first and the second primary loop output signals are given the logic one level when the privileged sequence is the data sequence supplied to the first and the second input ports 17, respectively. The first and the second primary loop output signals are branched to primary first and second branches 53(11) and 53(12) or 53 and are supplied through connections not shown in FIG. 3 to the first and the second control registers 31. When given the logic one level, the first and the second primary loop output signals make corresponding ones of the first and the second control registers 31 keep the control signals of the leading packets supplied thereto. Furthermore, the first and the second primary loop output signals of the logic one level put the first and the second primary flip-flops 49(1) and 51(1) on or in a lit state and thereby give the logic one level to the first and the second primary loop output signals.

Further turning to FIGS. 5 and 6 with FIGS. 3 and 4 continuously referred to, truth tables are shown for the first enable signal generator 45(1) and the first request arbiter 47(1). In FIG. 6, each crisscross indicates "don't care". It is now readily possible to make up such tables for the first arbiter 39(1) for three or more input ports 17 and to implement the first arbiter 39(1) as by a microcomputer.

Still further turning to FIGS. 7 and 8 with FIGS. 3 through 6 continuously referred to, selection logic tables are shown for the first and the second primary selectors 41(1) and 43(1). Those for the first and the second secondary selectors 41(2) and 43(2) are similar provided that the control signals and the selected data are reworded accordingly.

Referring now to FIG. 9 and again to FIGS. 3 and 4, the second arbiter 39(2) is similar in structure and operation to the first arbiter 39(1). A little more in detail, a second enable signal generator 45(2) is supplied from the first and the second control buffers 33 and from the first and the second control registers 31 with the control signals as indicated. A second request arbiter 47(2) is connected to the second enable signal generator 45(2) to supply the first and the second secondary selectors 41(2) and 43(2) with the control signals as depicted and to produce the secondary zeroth arbiter signal. Accompanied by the second request arbiter 47(2), first and second secondary flip-flops 49(2) and 51(2) are connected to the first and the second control registers 31. Like the primary first and second branches 53, secondary first and second branches 53(21) and 53(22) or 53 supply first and second secondary loop output signals to the first and the second control registers 31. It is now readily possible to implement third and other arbiters 39 when the output ports 19 are three or more in number.

Figures 9, 10:
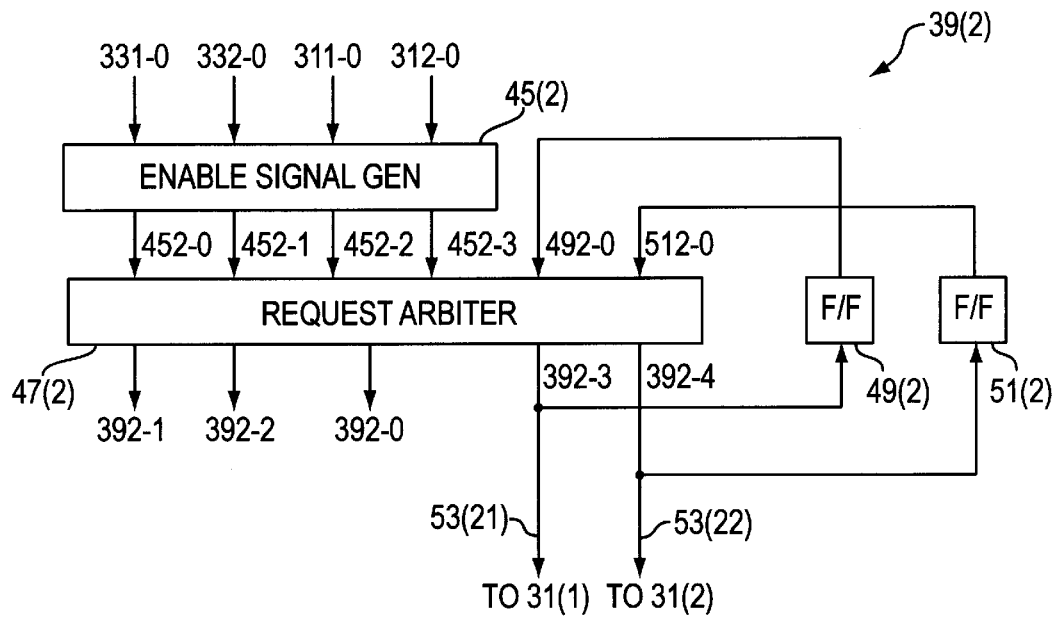
FIG. 9 is a block diagram of a second arbiter for use in the interconnection network depicted in FIG. 3.
FIG. 10 shows a truth table for use in describing operation of an enable signal generator used in the second arbiter depicted in FIG. 9.

Turning to FIG. 10 with FIGS. 3 to 9 again referred to, a truth table for the second enable signal generator 45(2) is similar to that shown in FIG. 5. Another truth table for the second request arbiter 47(2) is similar to that of FIG. 6 and is omitted. Selection logic tables for the first and the second secondary selectors 41(2) and 43(2) are similar to those of FIGS. 7 and 8 and are no more shown. It is now readily possible to make up such truth tables and selection logic tables when the output ports 19 are three or more in number.

Turning back to FIG. 3, description of the interconnection network will be continued. Prior to such a further description, the above-described operation of the interconnection network will be reviewed.

It is assumed as above that the interconnection network has the first and the second input ports 17 and the first and the second output ports 19. The first and the second input ports 17 are supplied with the first and the second sequences, each consisting of the first and the second packets.

It will first be presumed that both the first and the second sequences should be routed to the first output port 19(1). In this event, the first arbiter 39(1) is put in operation.

If the first sequence is given the priority right as the privileged sequence, the first primary flip-flop 49(1) is turned on to keep the control signal of the privileged sequence in the first control register 31(1). The first primary selector 41(1) selects the first packet of the privileged sequence and will select in a next subsequent machine cycle the second packet of the privileged sequence. In this machine cycle, the control signal of the privileged sequence is kept in the first control register 31(1). It is consequently possible for the first primary selector 41(1) to select the second packet with no delay.

If the second sequence is given the priority right, the second primary flip-flop 51(1) is turned on to keep the control signal of the second sequence in the second control register 31(2). The second primary selector 41(2) therefore selects the second packet of the second sequence with no delay after having selected the first packet of the second sequence.

It will now be presumed that both the first and the second sequences should be routed to the second output port 19(2). In this event, the second arbiter 39(2) is put in operation.

If the first sequence is given the priority right, the first secondary flip-flop 49(2) is lit to keep the control signal of the first sequence in the first control register 31(1). The first secondary selector 41(2) selects the first packet of the first sequence and will select in a next subsequent machine cycle the second packet of the first sequence. Inasmuch as the control signal is kept in the first control register 31(1), this selector 41(2) selects the second packet with no delay.

If the second sequence is the privileged sequence, the second secondary flip-flop 51(2) is lit to keep the control signal of the second sequence in the second control register 31(2). The first secondary selector 41(2) selects the second packet of the second sequence with no delay.

It will now first be surmised that the first primary selector 41(1) selects one of the first and the second data register units 35. In a first machine cycle, this selector 41(1) selects the first packet of a selected sequence of the first and the second sequences as the first primary selected signal 411-0. In a second machine cycle, the second packet of the selected sequence is selected as the first primary selected signal. The second primary selector 43(1) is for selecting in the second machine cycle the first primary selected signal as the primary second selected signal 431-0.

It will next be surmised that the first secondary selector 41(2) selects one of the first and the second data register units 35. In a first machine cycle, this selector 41(2) selects the first packet of the selected sequence as the first secondary selected signal 412-0. In a second machine cycle, the second packet of the selected sequence is selected as the first secondary selected signal. The second secondary selector 43(2) is for selecting in the second machine cycle the first secondary selected signal as the secondary second selected signal 432-0.

In the interconnection network being illustrated, first and second output buffers 55(1) and 55(2) or 55 are connected to the second primary and secondary selectors 43 and therefore correspond to the first and the second output ports 19. The first and the second packets of the privileged sequence are stored either packet serially or in packet parallel in one of the first and the second output buffers 55 that corresponds to the above-mentioned one of the output ports 19. In this manner, the consecutive packets of the privileged sequence are stored in one or the other of the output buffers 55 as secondary stored packets and are produced as secondary supply packets. For convenience of the description which follows, the first and the second packets of the privileged sequence are referred to as first and second primary output buffered signals 551-0 and 551-1 when produced from the first output buffer 55(1). When produced from the second output buffer 55(2), such packets are called first and second secondary output buffered signals 552-0 and 552-1. When stored in packet serial in a correlated one of the output buffers 55, the second packet is preferably stored in a memory word for the first packet without destruction of the first packet.

First and second output selectors 57(1) and 57(2) or 57 are connected to the first and the second output buffers 55 and to the first and the second output ports 19. In the manner described in the following, the first and the second output selectors 57 are controlled by first and second output selector control signals to select the secondary supply packets as output packets for delivery to the above-mentioned one of the output ports 19 in packet serial. Produced from the first and the second output selectors 57, primary and secondary output packets are indicated by 571-0 and 572-0. Select logic tables for the first and the second output selectors 57 are not different from that shown in FIG. 10 except for the control signals and the selected data and will not be described any longer.

Produced from the first and the second arbiters 39, the primary and the secondary zeroth arbiter signals 391-0 and 392-0 indicate the validity bit V and, instead of the routing address RA, a reply routing address RRA. This routing address represents the input port number of one of the input ports 17 that should receive the privileged sequence and is equal to the routing address indicative of the destination port.

Such validity bits and reply routing addresses are stored in first and second additional buffers 59(1) and 59(2) or 59. The reply routing addresses are delivered to the first and the second output ports 19 in synchronism with delivery of the first packet of the privileged sequence to the destination port and are used in the memory unit 15 described in conjunction with FIG. 1. In response, the memory unit 15 produces the reply data which are described before in connection with FIG. 1 and are transferred to the input port in question through another interconnection network described hereinabove.

From the first and the second additional buffers 59, the validity bits stored therein are delivered to first input terminals of first and second two-input AND gates 61(1) and 61(2) or 61. First and second output signals of the first and the second AND gates 61 are supplied to first and second control flip-flops 63(1) and 63(2) or 63, each of which has an inverter output terminal and which hold first and second control flags.

Produced through the inverter output terminals, the first and the second control flags are delivered to second input terminals of the first and the second AND gates 61 in a machine cycle next following the machine cycle in which the first packets are selected by the first and the second output selectors 57. The gates 61 produce the first and the second output signals as the first and the second output selector control signals which are now indicated by labels 611-0 and 612-0.

On selecting the first packet of the privileged sequence by one of the first and the second output selectors 57, the first and the second additional buffers 59 produce the validity bit of the binary one level. The gates 61 give the binary one level to the first and the second output selector control signals and to the first and the second control flags. In a next machine cycle, the binary zero bits are supplied to the second input terminals of the gates 61. Irrespective of the validity bits produced from the first and the second additional buffers 59, the binary zero level is given to the first and the second output selector control signals to make the first and the second output selectors 57 select the second and subsequent packets supplied from the first and the second output buffers 55.

It is now understood that combinations of the first and the second additional buffers 59, the first and the second AND gates 61, and the first and the second control flip-flops 63 serve as serial operating means for making the first and the second output selectors 57 produce the output packets in packet serial, It is readily possible to adapt the serial operating means to each data sequence composed of up to N consecutive packets.

While this invention has thus far been described in specific conjunction with a single preferred embodiment thereof, it is possible for one skilled in the art to put this invention into practice in various other manners, For example, it is possible to use the first through the P-th input port numbers of a descending order or of a certain prescribed order, in this event, the privileged sequence is what is received by one of the input ports 17 that is identified by the input port number of a predetermined one among the input port numbers of the prescribed order when two or more data sequences are received by ones of the input ports 17 with the leading packets of these data sequences received in one machine cycle to indicate a common address of the routing addresses. It is possible to make the interconnection network deal with data sequences which are composed of different numbers of consecutive packets and more than four consecutive packets.

What is claimed is:

1. An interconnection network for use between a processor unit and a memory unit of a parallel computer system in transferring data sequences from a first plurality of input ports to a second plurality of output ports with each data sequence of said data sequences composed of consecutive packets and routed to one of said input ports that is specified by a leading packet of said consecutive packets, said interconnection network comprising:

input buffer means, wide enough to accommodate two data packets simultaneously, connected to said input ports for storing at least a leading portion of said data sequence with the consecutive packets of said leading portion stored as primary stored packets and for simultaneously producing said primary stored packets in one machine cycle in a packet-parallel fashion as supply packets;

input selector means connected to said input buffer means for selecting primary selected packets from said supply packets to produce said primary selected packets and for selecting, as soon as a remaining portion of said data sequence reaches said input buffer means, secondary selected packets from the consecutive packets of said remaining portion to produce said secondary selected packets; and output buffer means connected to said input selector means and to said output ports for storing said primary and said secondary selected packets collectively as secondary stored packets to produce said secondary stored packets as output packets for delivery to one of said output ports.

2. An interconnection network as claimed in claim 1, wherein said input ports are connected to said processor unit, said output ports being connected to said memory unit.

3. An interconnection network as claimed in claim 1, wherein said input ports are connected to said memory unit, said output ports being connected to said processor unit.

4. An interconnection network as claimed in claim 1, wherein said input selector means judges a priority right given to each of said data sequences to determine the data sequence having said priority right as a privileged sequence and to select said supply packets as said primary selected packets and the consecutive packets of said remaining portion as said secondary selected packets when the primary stored packets are the consecutive packets of the leading portion of said privileged sequence.

5. An interconnection network as claimed in claim 1, said input ports being identified by first through P-th input port numbers of an ascending order and receiving said data sequences with the leading packets of said data sequences received in respective machine cycles, where P represents said first plurality, said output ports being identified by first through Q-th routing addresses, where Q represents said second plurality, the leading packet of each data sequence specifying one of said routing addresses, wherein said input buffer means comprises:

control registers connected to said input ports, respectively, for holding the routing addresses of said leading packets to produce the routing addresses held therein as held addresses;

control buffers connected to said control registers, respectively, for storing said held addresses as stored addresses;

data register units connected to said input ports, respectively, for holding the consecutive packets of said data sequences during a predetermined number of machine cycles to produce the consecutive packets held therein as held packets; and data buffers connected to said input ports, respectively, and to said data register units, respectively, for storing said held packets as said primary stored packets to simultaneously produce said primary stored packets in one machine cycle as said supply packets.

6. An interconnection network as claimed in claim 5, said one of output ports being identified by a particular address among said routing addresses, ones of said input ports receiving preceding sequences of said data sequences with the leading packets of said preceding sequences received earlier in one machine cycle to specify a common address as said particular address than the leading packets specifying said common address in others of said data sequences, wherein said input selector means judges one of said preceding sequences as said privileged sequence when said one of preceding sequences is received by one port of said ones of input ports that is identified by a smallest one of said first through said P-th input port numbers among the input port numbers given to said ones of input ports.

7. An interconnection network as claimed in claim 6, said supply packets being primary supply packets, wherein said input selector means comprises:

arbiter means connected to said control registers and said control buffers for determining said one of preceding sequences as said privileged sequence to produce a first and a second arbiter signal, said first arbiter signal indicating one of said data register units and one of said data buffers that are connected to said one port, said second arbiter signal indicating through said output buffer means said one of output ports;

first input selector means connected to said data register units, said data buffers, and said arbiter means for selecting the consecutive packets stored in said one of data buffers as primary input selector selected packets and the consecutive packets held in sail one of data register units as secondary input selector selected packets; and second input selector means connected to said arbiter means, said first input selector means, and said output buffer means for selecting said secondary selected packets as secondary supply packets to deliver said secondary supply packets to said one of output ports.

8. An interconnection network as claimed in claim 7, further comprising content holding means connected to said arbiter means and said control registers for making said one of control registers hold said held address until said arbiter means determines said one of preceding sequence as said privileged sequence.

9. An interconnection network as claimed in claim 8, wherein said output buffer means comprises:

output buffers connected to said second input selector means and corresponding to said output ports, respectively, for storing said primary and said secondary selected packets collectively as said secondary stored packets to produce said secondary stored packets as said secondary supply packets; and output selector means connected to said arbiter means, said output buffers, and said output ports for selecting said output packets from said secondary supply packets for delivery to said one of output ports.

10. An interconnection network for use between a processor unit and a memory unit of a parallel computer system in transferring data sequences from a first plurality of input ports to a second plurality of output ports with each of said data sequences composed of consecutive packets and routed to one of said output ports that is specified by a leading packet of said consecutive packets, said interconnection network comprising:

input buffer means, wide enough to accommodate two data packets simultaneously, connected to said input ports for storing the consecutive packets of each data sequence packet by packet as primary stored packets and for simultaneously producing said primary stored packets one machine cycle in a packet-parallel fashion as supply packets;

selector means connected to said input buffer means for selecting said supply packets as selected packets and for selecting a leading and a remaining portion of said supply packets collectively as said selected packets, said leading portion being selected when all the consecutive packets of said each data sequence are not stored in said input buffer means, said remaining portion being selected as soon as each of the consecutive packets of said each data sequence reaches said input buffer means; and output buffer means connected to said selector means and to said output ports for storing said selected packets as secondary stored packets to produce said secondary stored packets as output packets for delivery to one of said output ports.

* * * * *